May 16, 1933.  E. J. SVENSON  1,909,135
SPINDLE CONSTRUCTION FOR MACHINE TOOLS
Filed March 16, 1928
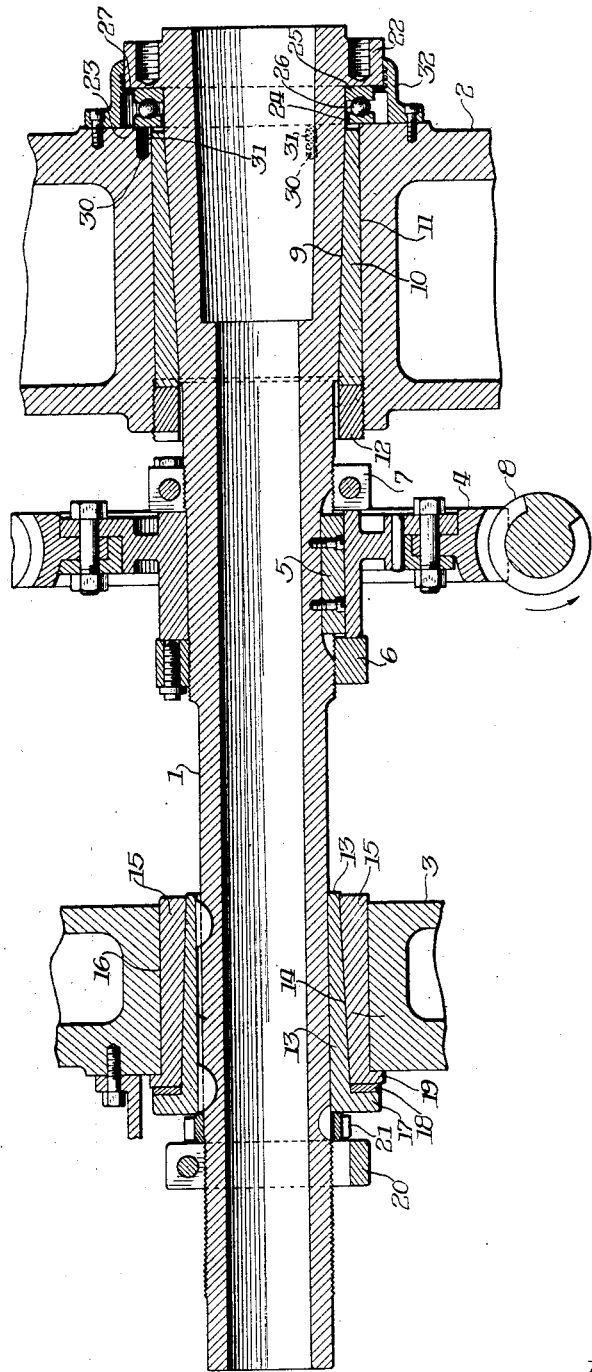
Inventor:
Ernest J. Svenson.
By Churdahl Parker Carlson
Attys Patented May 16, 1933

1,909,135

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

SPINDLE CONSTRUCTION FOR MACHINE TOOLS

Application filed March 16, 1928. Serial No. 262,111.

The invention relates generally to spindle mountings and more particularly to a novel headstock spindle construction for a lathe.

In the modern high speed production of turned parts it is the practice to use high work speeds, relatively heavy cuts and a relatively rapid feeding movement of the cutting tools. Under such conditions the headstock spindle is subjected to a heavy axial thrust load as a result of the cutting operation. As it is necessary to apply a substantial pressure on the tailstock center in order to prevent lateral displacement of the work due to the radial thrust of the tool, additional axial thrust is placed on the spindle. Such thrust results in undue loads and wear on the headstock spindle bearings. Various other factors sometimes enter into consideration, as for instance the use of a worm and worm wheel drive for the spindle which drive causes a thrust in the direction of rotation of the worm.

The wearing of the bearings which has been experienced due to the heavy thrust loads on the spindle has had many disadvantageous results. In headstocks as constructed heretofore this wear has permitted radial play of the headstock spindle which has caused the production of eccentric work. It also has permitted longitudinal play in the spindle which has made it practically impossible to produce accurately faced work, especially in cases where the facing operation is gaged from the work support or bed of the lathe rather than from the face of the spindle.

The primary object of the present invention is to provide a new and improved spindle construction having bearings arranged so as to prevent appreciable wear due to the large end thrust ordinarily imposed upon such headstocks.

A further object is to provide an improved spindle mounting having bearings arranged so as to avoid placing a thrust load upon the radial bearings thereof.

Another object is to provide a headstock having an antifriction thrust bearing with races abutting directly against the supporting frame and an integral part of the spindle respectively and having means for adjusting the spindle longitudinally in the frame so as to maintain the races in intimate contact with the antifriction elements of the bearing.

In pursuance of the foregoing objects I aim to provide a spindle mounted in a frame having two oppositely disposed adjustable taper bearings, an antifriction thrust bearing interposed between an integral part of the spindle and the frame, and means for maintaining the spindle in its proper position longitudinally of the frame.

Other objects and advantages will become apparent from the following description and from the accompanying drawing in which the figure is a longitudinal central section through a spindle construction embodying the preferred form of the invention.

In the embodiment of the invention chosen for purposes of disclosure a spindle 1 is shown rotatably mounted in a lathe headstock frame having a forward support 2 and a rear support 3 preferably formed in an integral casting. Means for rotating the spindle is herein shown as comprising a worm wheel 4 fixed upon the spindle intermediate the front and rear supports by means of a key 5 and collars 6 and 7 which are screw threaded upon the spindle on opposite sides of the worm wheel. This wheel is arranged to be driven by a suitable worm 8.

The spindle 1 is preferably provided with front and rear tapered bearings and has a bearing surface 9 formed adjacent the forward end thereof, this surface tapering rearwardly to conform to a suitable tapered bearing sleeve 10 which is positioned in a bore 11 in the forward support 2 so as to be adjustable longitudinally of the spindle by means of a nut 12. This nut is preferably screw threaded into the rear portion of the bore 11.

The rear bearing is herein illustrated as comprising a bushing 13 which is mounted upon the spindle 1 for movement longitudinally thereof but against rotative movement relative thereto, and has an outer bearing surface 14 tapering inwardly toward the forward end of the spindle. An internally tapered bearing sleeve 15 is mounted in a bore 16 in the rear support 3 and in operable engagement with the surface 14 of the sleeve 13.

At the rear end of the bushing 13 an outwardly extending annular flange 17 is formed and a thrust washer 18 is positioned between this flange and a corresponding flange 19 on the end of the sleeve 15. Means is preferably provided for adjusting the bushing 13 longitudinally of the spindle so as to permit of adjusting the spindle relatively to the supports 2 and 3. In the present instance this means comprises a split nut 20 which is in threaded engagement with the outer surface of the spindle adjacent the flange 17 of the bushing 13. (As illustrated herein a gear 21 is slidably mounted on the spindle intermediate the unit 20 and sleeve 13, which gear is intended for driving mechanism not pertinent to the invention herein disclosed.) Thus when the nut 20 is turned so as to move the inner sleeve 13 relatively to the spindle, the spindle will be drawn rearwardly of the two supports and the tapered surface 14 will be brought into engagement with the tapered bearing sleeve 15 at the rear end of the spindle. The invention contemplates that the thrust flanges 17 and 19 will be of such a size that an even wear will occur on the thrust and tapered bearings between the bushing 13 and sleeve 15.

In order that the longitudinal position of the spindle relatively to the supports may be definitely determined at all times so that work pieces may be accurately faced by gaging the cutting tool relatively to the frame or bed of the machine, bearing means is provided intermediate the spindle and the frame adapted definitely to limit the rearward movement of the spindle relative to the frame. In the present instance this means comprises an antifriction or ball-bearing interposed between an annular flange 22 on the forward end of the spindle 1 and an accurately finished surface 23 on the forward end of the support 2. This bearing comprises a pair of races 24 and 25 and suitable balls 26 interposed therebetween. In the preferred form of the invention, these races are arranged to bear directly against the rear face of the flange 22 on the spindle and the forward face of the support 2.

To this end the surface 23 is accurately machined on the forward face of the support 2 perpendicular to the axis of the spindle, and the rear surface 27 of the flange 22 is also accurately finished and perpendicular to the spindle axis. The forward race 25 is preferably secured on the spindle 1 in abutment with the surface 27 by means of a light press fit on the spindle. The rear race 24 is positioned in abutment with the surface 23 on the forward support.

To adjust the bearings so as to avoid undue wear, the adjusting nut 12 of the forward radial bearing is first loosened so that this bearing will not prevent rearward movement of the spindle 1. The rear nut 20 is then turned about the spindle 1 so as to draw the spindle rearwardly of the support. This movement is continued until the races 24 and 25 of the ball-bearing are in proper contact with the balls and the rear race 24 is against the surface 23 whereupon the nut is then clamped in its adjusted position by suitable means. The front radial bearing is then adjusted by turning the nut 12 so as to move the forward bearing sleeve 10 along the spindle and into contact with the tapered surface 9 thereon.

In order that the balls 26 may be maintained in their proper positions between the two races, even if there is some end play of the spindle in its bearing, means is provided to press the race 24 forward against the balls 26. In the present instance this means comprises a plurality of expansive coil springs 30 mounted in suitable bores 31 formed in the forward support 2 at spaced intervals about the bore 11 so that the forward ends of the springs will engage the race 24 to urge it forwardly from the support. An annular guard 32 is preferably secured to the support 2 so as to surround and protect the bearing.

From the foregoing description it will be apparent that the invention provides a spindle construction having bearings which may be readily and accurately adjusted so that the spindle will rotate about an unvarying axis. A definite longitudinal position of the spindle in the frame is insured by means of the ball thrust bearing the races of which abut two accurately formed surfaces on integral portions of the frame and spindle and the means for locking the parts in their adjusted positions, and due to the fact that the radial bearings are not subjected to thrust loads, the adjustment of the bearings will be maintained for a considerable period of time. Thus when embodied, for example, in a lathe headstock, the invention makes possible the rapid and consistent production of accurately turned work which may be faced by gaging the cutting tool relatively to the frame or bed of the machine.

It will also be apparent that the provision of resilient means urging the races of the thrust bearing against the balls will prevent the balls from dropping in case there is any end play between the races and thereby obviates scoring of the balls or races such as occurs due to wedging of the bearings when the end play is not taken up automatically. This construction further serves to prevent longitudinal displacement of the spindle such as might otherwise occur due to wear of the thrust bearing.

I claim as my invention:

1. A lathe headstock comprising, in combination, a frame, a spindle rotatably mounted thereon on radially adjustable bearings, a shoulder formed on said spindle having a rearwardly facing surface perpendicular to the spindle axis, a surface formed on said frame adjacent said first mentioned surface and parallel thereto, a ball thrust bearing interposed between said surfaces and having a forward race positioned on said spindle against said shoulder and a rear race abutting said frame surface, a plurality of bores in said frame, and a plurality of expansive springs therein operable when there is any longitudinal play in the spindle to force said rear race forwardly away from said frame and into firm contact with the bearing balls so as to maintain said balls in proper position relatively to said races.

2. A lathe spindle mounting comprising, in combination, a frame having front and rear supports, a spindle rotatably mounted in said supports and having an outwardly projecting annular flange on the work supporting end thereof in front of said front support, an antifriction thrust bearing interposed between said front support and said flange, a rearwardly tapering bearing surface formed on said spindle so as to be positioned in said front support, a tapered bearing sleeve mounted in said front support for adjustment longitudinally of said spindle so as to bear against said tapered surface, a bearing sleeve in said rear support fixed against forward longitudinal movement therein and having an inner bearing surface tapering inwardly toward the forward end of the spindle, and a complementary inner sleeve and bearing bushing mounted on said spindle rearwardly of said last mentioned sleeve for adjustment longitudinally of the spindle.

3. A lathe headstock comprising a frame, a spindle rotatably mounted therein, an outwardly projecting annular flange on the forward end of said spindle, an antifriction thrust bearing interposed between said flange and said frame, a tapered bearing having inner and outer tapered sleeves formed with opposing surfaces forming a thrust bearing, the inner sleeve being longitudinally adjustable along said spindle to draw said spindle rearwardly of said frame so as to draw said front thrust bearing firmly against said frame and said flange, and a second tapered bearing adjacent said antifriction thrust bearing comprising a rearwardly tapering surface on said spindle and a tapered sleeve adjustable in said frame along said shaft so as to take up radial play between said sleeve and said tapered surface.

4. A lathe headstock comprising, in combination, a frame, a spindle rotatably mounted thereon, an annular shoulder formed on said spindle adjacent its work supporting end having a rear surface perpendicular to the axis of said spindle, a surface formed on said frame perpendicular to said spindle, an antifriction thrust bearing interposed between said surfaces, resilient means positioned between said frame and the adjacent race of said thrust bearing for urging said race away from said frame surface and maintaining the parts of the thrust bearing in assembled relation, means for drawing said spindle longitudinally through said frame to bring said antifriction bearing into firm contact with said surfaces, a tapered bearing interposed between said frame and said spindle adjacent said antifriction bearing to take the radial load thereon, and means for independently adjusting said tapered bearing.

5. A spindle construction for a lathe comprising in combination, a frame, a spindle rotatably mounted on said frame, a ball thrust bearing intermediate a shoulder formed on said spindle and the front face of said frame, front and rear radial bearings for the spindle, said front bearing being arranged to permit of longitudinal movement of the spindle for adjusting the ball thrust bearings, said rear bearing including an internally tapered sleeve secured to the frame, and an externally tapered bushing engaging said sleeve and slidable longitudinally on the spindle, said bushing and sleeve having opposing surfaces at one end forming a thrust bearing opposing the ball thrust bearing, and a nut threaded on to said spindle arranged to take up end play in said thrust bearings.

6. A spindle construction of the character described comprising, in combination, a frame, a rotatably mounted spindle thereon, radially adjustable front and rear tapered bearings therefor, a ball thrust bearing intermediate the front bearing support and a shoulder formed on the spindle at the work supporting end thereof, means for independently adjusting the front tapered bearing, and an adjusting nut on the rear end of the spindle arranged to take up the rear tapered bearing and said ball thrust bearing simultaneously and to lock the parts in their assembled relation.

7. A spindle construction of the character described comprising, in combination, a frame, a rotatable spindle mounted thereon, radial bearings for said spindle, a ball thrust bearing interposed between said frame and a shoulder formed on said spindle, means for adjusting the amount of end play in said thrust bearing, and resilient means arranged to urge the races of said thrust bearing against the balls and thereby maintain the parts of the bearing in assembled relation.

8. A spindle construction for a lathe, comprising, in combination, a frame, a spindle rotatably mounted in said frame, an antifriction thrust bearing acting between said frame and a shoulder formed on the forward, work-supporting end of the spindle, a combined thrust and radial bearing at the rear end of said spindle acting between said frame and said spindle in opposition to said first mentioned thrust bearing, a nut on said spindle operable to adjust said combined bearing longitudinally of the spindle to tighten said first mentioned thrust bearing, and a radially adjustable bearing acting between said frame and the forward end of the spindle.

9. A lathe headstock comprising, in combination, a frame, a spindle rotatably mounted thereon, a shoulder formed on said spindle adjacent the work supporting end thereof, a ball thrust bearing interposed between said shoulder and the frame, a thrust bearing at the rear end of said spindle having a member thereof abutting the rear end of the frame, means adjustably mounted on the rear end of said spindle for simultaneously taking up both of said thrust bearings, a radial bearing at the forward end of said spindle, and means for independently adjusting said radial bearing.

In testimony whereof, I have hereunto affixed my signature.

ERNEST J. SVENSON.